United States Patent
Dowty

(10) Patent No.: US 12,054,081 B2
(45) Date of Patent: Aug. 6, 2024

(54) SEAT PAN IMPULSE DEVICE FOR THE REDUCTION OF SPINAL TENSION LOADS RESULTING FROM A FREE FLAIL EVENT

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 193 days.

(21) Appl. No.: 17/705,614

(22) Filed: Mar. 28, 2022

(65) Prior Publication Data

US 2023/0302972 A1    Sep. 28, 2023

(51) Int. Cl.
*B60N 2/427*     (2006.01)
*B60N 2/42*      (2006.01)

(52) U.S. Cl.
CPC ......... *B60N 2/4279* (2013.01); *B60N 2/4221* (2013.01); *B60N 2/42763* (2013.01)

(58) Field of Classification Search
None
See application file for complete search history.

(56) References Cited

U.S. PATENT DOCUMENTS

| 4,981,131 A | 1/1991 | Hazard |
| 5,746,395 A | 5/1998 | Peck et al. |
| 5,791,597 A | 8/1998 | Knoll |
| 5,947,543 A | 9/1999 | Hubbard |
| 6,467,099 B2 | 10/2002 | Dennis et al. |
| 6,623,033 B2 | 9/2003 | Breed |
| 6,682,141 B2 | 1/2004 | Reynolds et al. |
| 7,131,702 B2 | 11/2006 | Dennis |
| 7,354,106 B2 | 4/2008 | Dennis |
| 10,899,456 B2 | 1/2021 | Penley et al. |
| 11,377,058 B2* | 7/2022 | Ohno .................... B60R 21/207 |
| 2013/0082457 A1* | 4/2013 | Hashido ............. B60N 2/42718 280/730.1 |
| 2014/0358378 A1 | 12/2014 | Howard et al. |
| 2018/0281625 A1* | 10/2018 | Akaba .................. B60N 2/0276 |

(Continued)

FOREIGN PATENT DOCUMENTS

DE      102010003315 A1    9/2011
JP         62020736 A  *   1/1987

(Continued)

OTHER PUBLICATIONS

Extended European Search Report dated Aug. 21, 2023; European Application No. 23161605.3.

*Primary Examiner* — David E Allred
(74) *Attorney, Agent, or Firm* — Suiter Swantz IP

(57) ABSTRACT

A system and method for delivering an axial compression load to a passenger during a frontal deceleration event is disclosed. The system includes a seat frame, a seat pan, and an impulse generator coupled to the seat pan configured to provide an axial compression load onto a spine of a sitting passenger during a forward deceleration event. The system further includes a controller configured to receive a forward deceleration signal from the inertial sensor and activate the impulse generator based on the forward deceleration signal. The impulse generator may generate a compressive force via a chemical reaction, via a mechanically stored energy, a solenoid switch, or via a rotating cam assembly.

14 Claims, 15 Drawing Sheets

(56) References Cited

U.S. PATENT DOCUMENTS

| | | | |
|---|---|---|---|
| 2019/0106215 A1* | 4/2019 | Penley | B64D 11/0619 |
| 2020/0047698 A1* | 2/2020 | Akoma | B60N 2/42763 |
| 2020/0122610 A1* | 4/2020 | Tanaka | B60N 2/4221 |
| 2021/0094570 A1 | 4/2021 | Uchida | |
| 2023/0219517 A1* | 7/2023 | Cheng | B60N 2/665 |
| | | | 280/743.1 |
| 2023/0286426 A1* | 9/2023 | Viano | B60N 2/4228 |

FOREIGN PATENT DOCUMENTS

| | | | | |
|---|---|---|---|---|
| JP | 05286386 A | * | 11/1993 | |
| JP | 2001517514 A | | 10/2001 | |
| JP | 2004034797 A | * | 2/2004 | B60N 2/42763 |
| JP | 2009510373 A | | 3/2009 | |
| JP | 2009119181 A | | 6/2009 | |
| JP | 2009165735 A | | 7/2009 | |
| WO | 2006022730 A1 | | 3/2006 | |
| WO | 2013180089 A1 | | 12/2013 | |

* cited by examiner

SEAT PAN IMPULSE DEVICE FOR THE REDUCTION OF SPINAL TENSION LOADS RESULTING FROM A FREE FLAIL EVENT

BACKGROUND

Seat belts are designed to prevent serious injury in vehicle accidents. However, in high-speed accidents, a sudden deceleration may cause a passenger's spine to experience high tension loads as the passenger jerks forward violently. These high-tension loads are particularly dangerous for front row passengers that do not have an aft portion of a seatback in front of them to slow down forward momentum. These "free flail" passengers could be further protected via 3-point or 5-point harness systems, airbags or other restraint system. However, these products are often heavy, and may require structural reinforcement to withstand load. Therefore, it is desirable to provide a system that safely protects passengers during sudden decelerations that are without the limitations of current safety devices.

SUMMARY

A safety seat system for a vehicle is disclosed. In one or more embodiments, the safety seat system includes an impulse generator couplable to a seat pan configured to provide an axial compression load onto a spine of a sitting passenger during a forward deceleration event. In one or more embodiments, the safety seat system further includes a controller communicatively coupled to the impulse generator and an inertial sensor. In one or more embodiments, the safety seat system further includes one or more processors and a memory with instructions stored upon. In one or more embodiments, instructions stored upon the one or more processors cause the one or more processors to receive a forward deceleration signal from the inertial sensor. In one or more embodiments, instructions stored upon the one or more processors cause the one or more processors to activate the impulse generator.

In some embodiments of the system, the safety seat system includes a seat frame. In some embodiments of the system, the safety seat system further includes a seat pan coupled to the seat frame In some embodiments of the system, the seat pan is fixed to the seat frame.

In some embodiments of the system, the axial compression load is configured as a series of impulses.

In some embodiments of the system, the impulse generator comprises a rotating cam assembly that includes a cam, wherein a nose of the cam imparts the axial compression load.

In some embodiments of the system, the impulse generator comprises a chemical energy system that includes at least one explosive or expansion charge that imparts the axial compression load.

In some embodiments of the system, the impulse generator comprises a stored energy source. In some embodiments of the system, the impulse generator comprises at least one of a piston or compression plate mechanically coupled to the stored energy source and to the seat pan, wherein upon a release of a stored energy from the stored energy source translates the piston or the compression plate, wherein a translation of the piston or compression plate provides the axial compression load.

In some embodiments of the system, the stored energy source is configured as a compressed spring.

In some embodiments of the system, the stored energy source is configured as an explosive.

In some embodiments of the system, the stored energy source is configured as a compressed gas or gas spring.

In some embodiments of the system, the system further comprises the inertial sensor.

In some embodiments of the system, the impulse generator further comprises a solenoid. In some embodiments of the system, the impulse generator further comprises a piston mechanically disposed within the solenoid and mechanically coupled to the seat pan, wherein an activation of the solenoid translates the piston, wherein a translation of the piston provides the axial compression load.

In some embodiments of the system, the system further comprises a seat belt.

A method is also disclosed. In one or more embodiments, the method includes detecting a forward deceleration event. In one or more embodiments, the method further includes transmitting a forward deceleration event signal to a controller. In one or more embodiments, the method further includes activating an impulse generator via the controller. In one or more embodiments, the method further includes delivering an axial compression load to the passenger based on the forward deceleration event signal.

In some embodiments of the method, delivering an axial compression load comprises rotating a cam assembly.

In some embodiments of the method, delivering an axial compression load comprises activating an expansion charge based on a chemical reaction.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
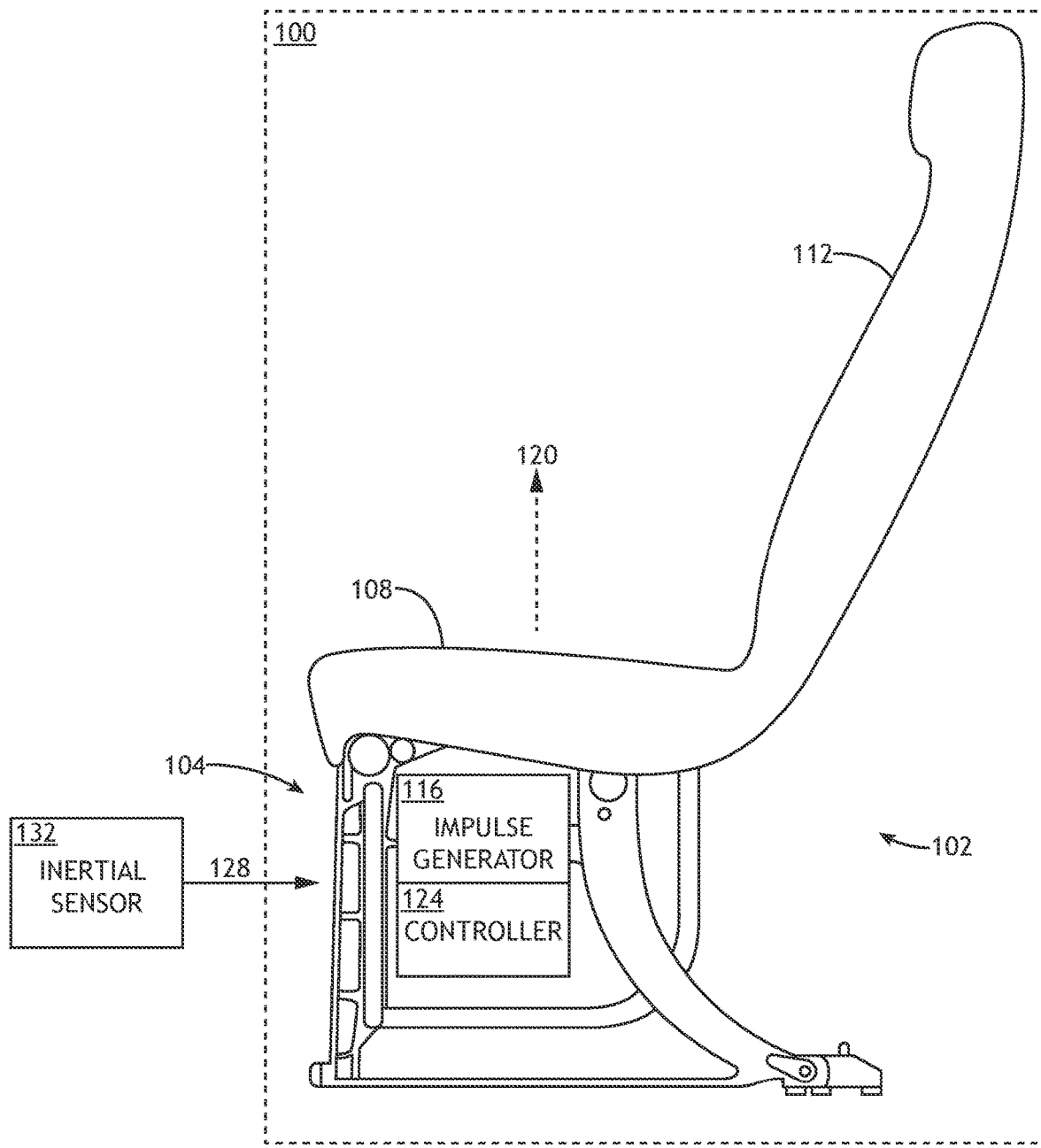
FIG. 1A is a diagram of a safety seat system 100, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A seat assembly for a vehicle that can reduce spinal loads during a crash is disclosed. The seat assembly includes a seat pan and impulse generator coupled to the seat pan that delivers an axial compression load, or a near axial compression load, to the spine of a sitting passenger. The axial compression load reduces spinal tension loads that occurs during a sudden deceleration of a vehicle. By countering the spinal tension loads, injury to the spine, pelvis, and other aspects of the passenger are reduced.

FIG. 1A is a diagram of a safety seat system 100, in accordance with one or more embodiments of the disclosure. The safety seat system 100 may be utilized by any type of vehicle or transportation technology including but not limited to aircraft, automobiles, locomotives, and spacecraft. The safety seat system 100 may include a seat 102 and safety components described herein, or may include only the safety components. For safety seat systems 100 that include the seat 102, the safety seat system 100 also includes a seat frame 104, a seat pan 108 coupled to the seat frame 104, and a seat back 112 coupled to the seat frame 104 and/or seat pan 108. The seat frame 104, seat pan 108 and seat back 112 may be configured for any type of seat, such as an aircraft passenger seat.

The safety seat system 100 further includes an impulse generator 116 coupled to the frame 104 and/or seat pan 108 and configured to deliver an axial compression load 120 to the spine of a sitting passenger (e.g., the axial compression load arising from the seat pan 108). The axial compression load 120 is applied during a sudden inertial event, such as a forward deceleration event. For example, the axial compression load 120 may be delivered as an aircraft decelerates after a rough landing or crashing. In another example, the axial compression load 120 may be delivered as an automobile is stopped suddenly in an accident. The axial compression load 120 reduces the spinal tension in a passenger during sudden deceleration, reducing injury. The safety seat system 100 further includes a controller 124 configured to provide processing functionality for the system 100. For example, the controller may be configured to receive a forward deceleration signal 128 from an inertial sensor 132. In another example, the controller may be configured to activate the impulse generator 116 based on the received forward deceleration signal 128. In some embodiments, the safety seat system 100 includes the inertial sensor 132 (e.g., disposed either adjacent to, or remotely from, the impulse generator 116) and/or the seat belt 206. In some embodiments, the safety seat system 100 includes the impulse generator 116, the impulse generator 116 and the controller 124, or the impulse generator 116, the controller 124, and the inertial sensor 132. For example, the safety seat system 100 may be a modular device that is fitted onto a passenger seat.

The inertial sensor 132 may be configured as any sensor capable of measuring the acceleration/deceleration of an object along at least one axis. For example, the inertial sensor 132 may be configured as sensor that measures the acceleration/deceleration and angular velocity of on object along three mutually perpendicular axes. The inertial sensor 132 may include micro electro mechanical system (MEMS)-based sensors, accelerometers, gyroscope-assisted accelerometers, magnetometers, and the like.

Figure 1B:
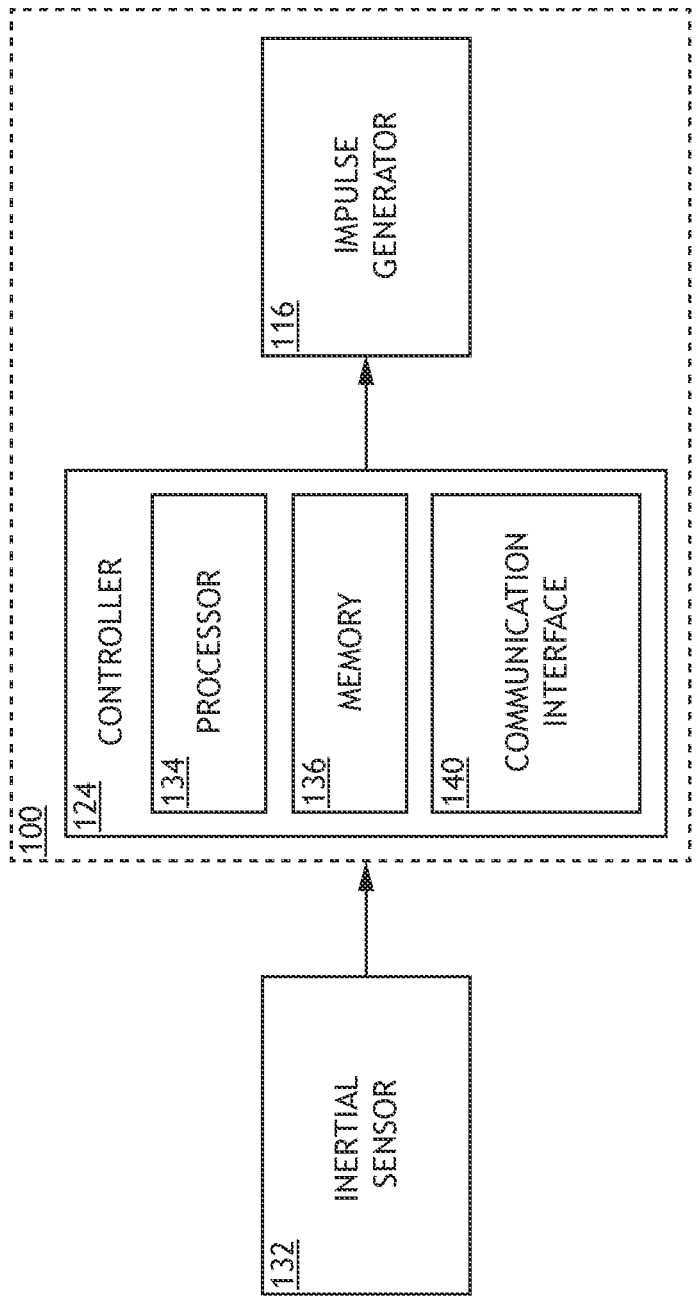
FIG. 1B is a block diagram illustrating the electronic componentry of the safety seat system 100, in accordance with one or more embodiments of the disclosure.

FIG. 1B is a block diagram illustrating the electronic componentry of the safety seat system 100, in accordance with one or more embodiments of the disclosure. The controller 124 includes one or more processors 134, memory 136, and a communication interface 140. The one or more processors 134 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 134 may include any device configured to execute algorithms and/or instructions (e.g., program instructions stored in memory). In one embodiment, the one or more processors 134 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 (e.g., the inertial sensor 132 and/or impulse generator) may include a processor 134 or logic elements suitable for carrying out at least a portion of the steps described in the present disclosure. Therefore, the above description should not be interpreted as a limitation on the embodiments of the present disclosure but merely as an illustration.

The memory 136 can be an example of tangible, computer-readable storage medium that provides storage functionality to store various data and/or program code associated with operation of the controller 124 and/or other components of the system 100, such as software programs and/or code segments, or other data to instruct the controller and/or other components to perform the functionality described herein. Thus, the memory 136 can store data, such as a program of instructions for operating the system 100 or other components. It should be noted that while a single memory 136 is described, a wide variety of types and combinations of memory 136 (e.g., tangible, non-transitory memory) can be employed. The memory 136 can be integral with the controller, can comprise stand-alone memory, or can be a combination of both. Some examples of the memory 136 can include removable and non-removable memory components, such as a programmable logic device, random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 140 can be operatively configured to communicate with components of the controller 124 and other components of the system 100. For example, the communication interface 140 can be configured to retrieve data from the controller 124 or other components, transmit data for storage in the memory 136, retrieve data from storage in the memory 136, and so forth. The communication interface 140 can also be communicatively coupled with controller 124 and/or system elements to facilitate data transfer between system components.

In some embodiments, the controller 124 is configured as circuitry disposed within and/or between the inertial sensor 132 and the impulse generator 116. For example, the inertial sensor 132 may send a signal directly to the impulse generator 116, which delivers the axial compression load 120. In this case, one or more functions of the controller 124 may be distributed within the inertial sensor 132, the impulse generator 116, and/or the circuitry between the inertial sensor 132 and the impulse generator 116.

Figure 2A:
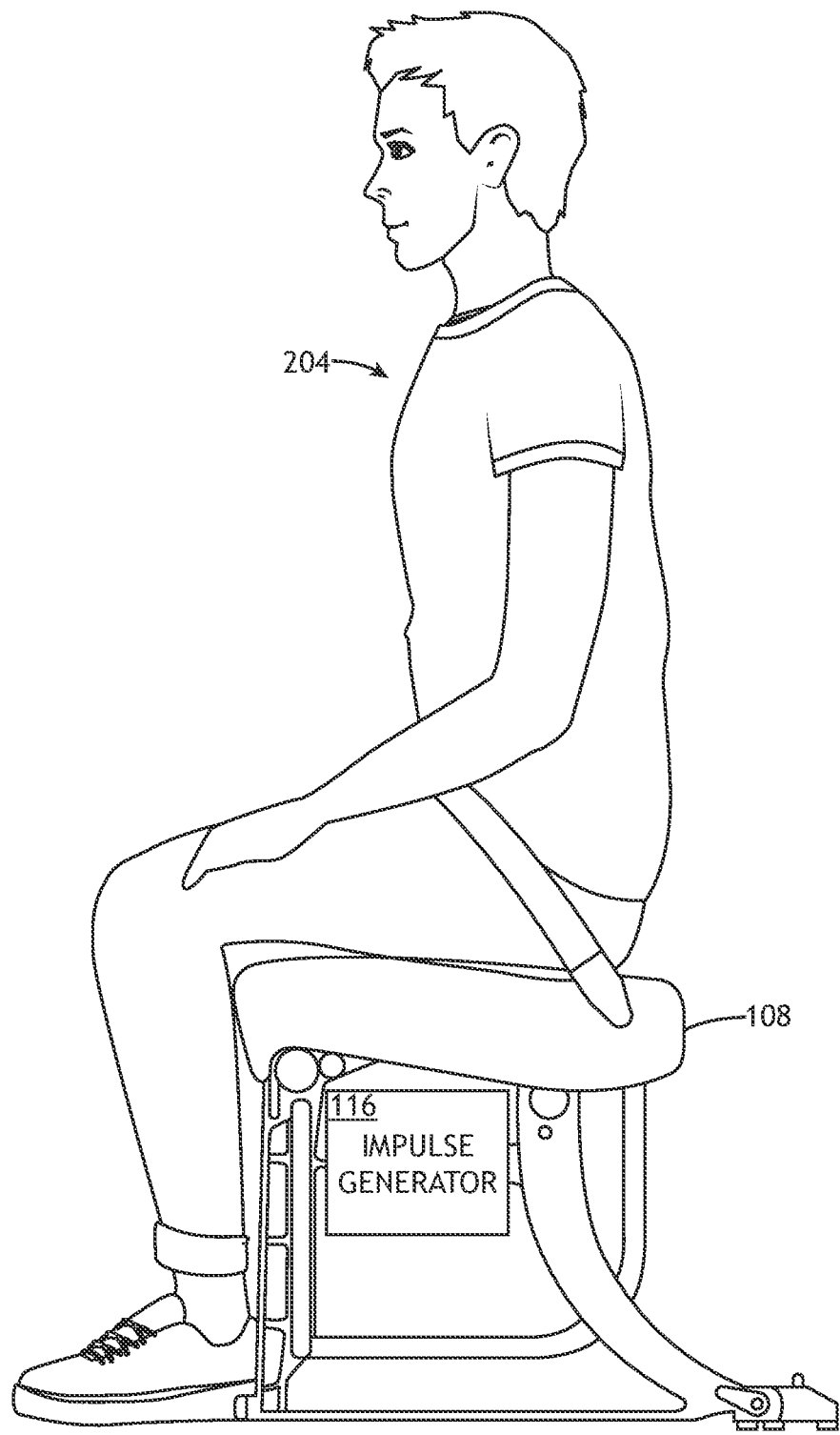
FIG. 2A are diagrams illustrating the safety seat system under normal travel conditions, in accordance with one or more embodiments of the disclosure.
Figure 2B:
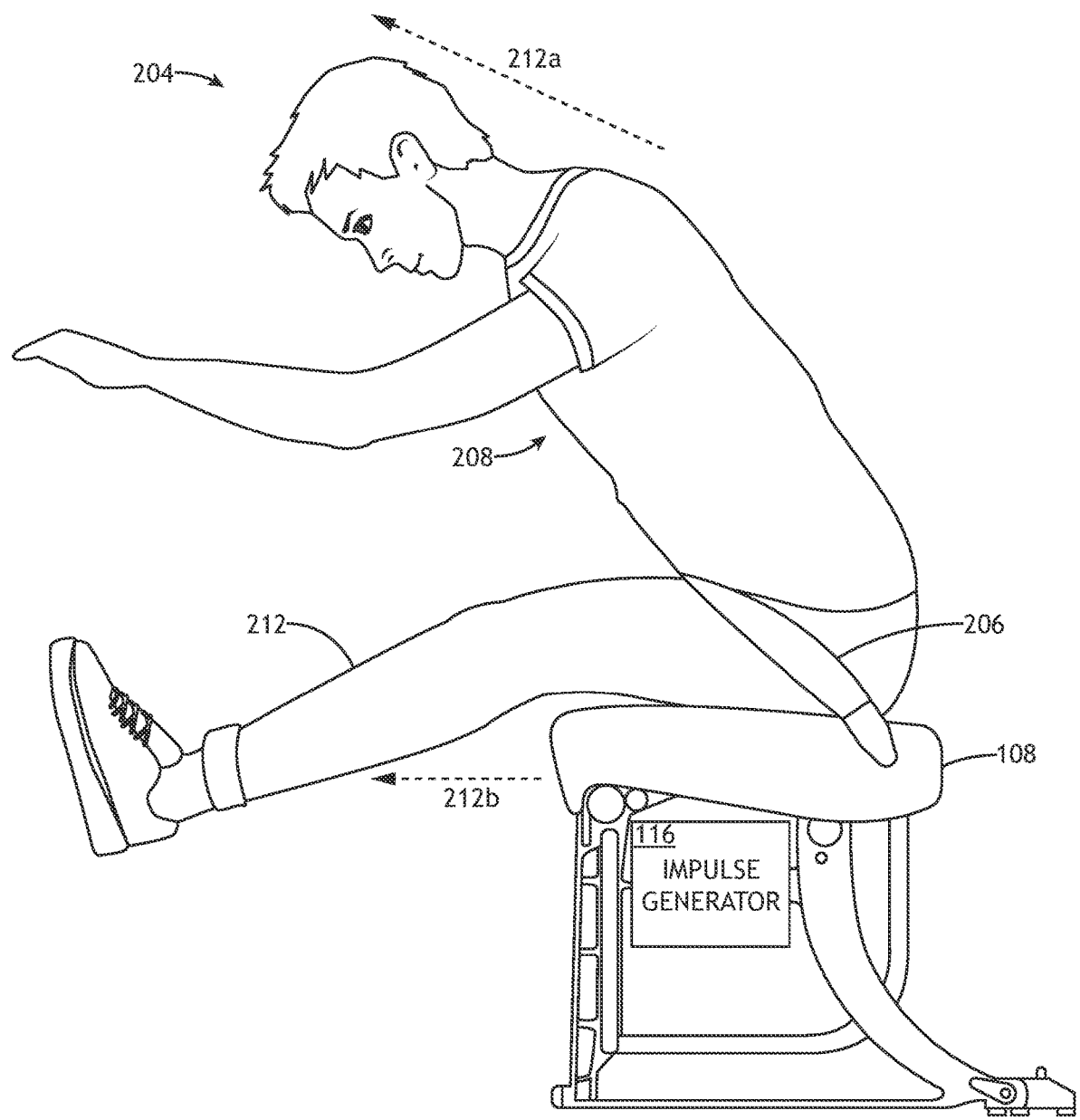
FIG. 2B are diagrams illustrating the safety seat system immediately before impulse generator activation during a forward deceleration event, in accordance with one or more embodiments of the disclosure.
Figure 2C:
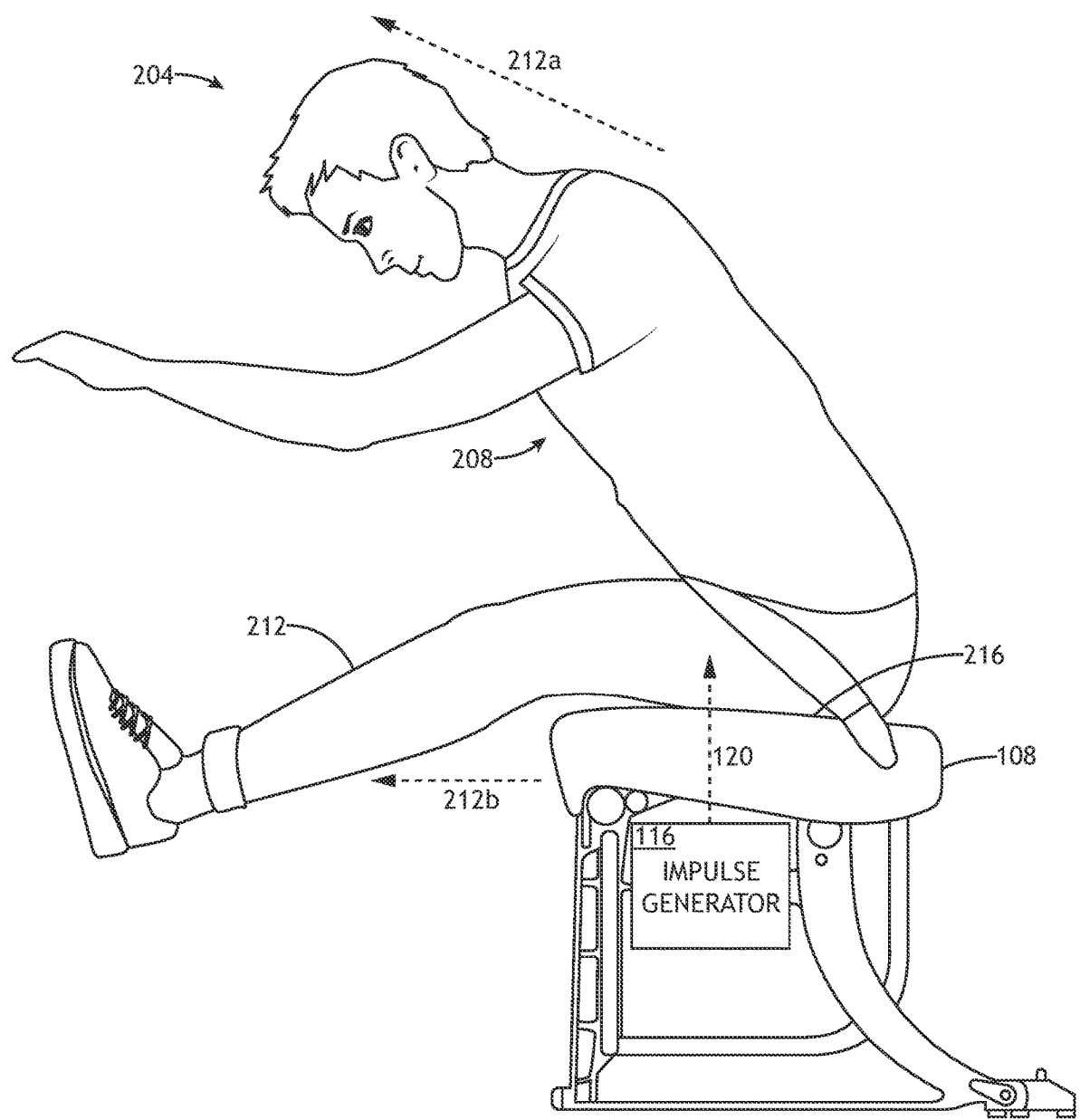
FIG. 2C are diagrams illustrating the safety seat system immediately after impulse generator activation during a forward deceleration event, in accordance with one or more embodiments of the disclosure.

FIG. 2A-C are diagrams illustrating the safety seat system 100 under normal travel conditions (e.g., as shown in FIG. 2A), immediately before impulse generator 116 activation during a forward deceleration, free flailing, event (e.g., as shown in FIG. 2B), and immediately after impulse generator activation 116 during a forward deceleration event (e.g., as shown in FIG. 2C). Under normal travel conditions, the passenger 204 configured in a sitting position upon the seat pan 108. Upon a sudden forward deceleration event, such as a crash, the passenger is held into place via a seat belt 206. Although the seat belt 206 prevents the passenger from ejection from the passenger seat, the restraint of the seat belt 206 places particular stresses upon the spine of the passenger. For example, for a waist-only seat belt 206, the passenger will endure spinal tension loads 212 at both the middle and upper spine (e.g., tension load 212a) and lower spine e.g., (tension load 212b). If not mitigated, high tension loads on the spine can lead to severe spinal, pelvic, and head/neck injuries. For seat belts 206, with shoulder restraint, a sudden forward event may still lead to high tension loads 212a-b at the lower spine and upon the cervical vertebrae at the upper spine.

As demonstrated in FIG. 2C, the addition of a strong, low amplitude compression load 120 (e.g., a compressive force) by the impulse generator 116 during the point highest tension load 212a-b counteracts the tension loads 212a-b, reducing the stress on the spine of the passenger 204, and reducing the risk of spinal injury. The compression load may be a single power 'stroke' that engages the spine or a series of power strokes configured to keep the spine in a compressive state during the forward deceleration event. The amplitude of the power stroke (e.g., the amount of distance a top surface 216 of the seat pan is moved upward upon activation of the impulse generator) is considerably small. For example, the power stroke may be configured to be less than 2 inches/5.08 cm. In another example, the power stroke may be configured to be less than one inch/2.54 cm. In another example, the power stroke may be configured to be less than one-half inch/1.27 cm. In another example, the power stroke may be configured to a quarter inch/0.635 cm. In another example, the power stroke may be configured to be less than a quarter inch/0.635 cm. Because the power stroke is considerably small, the seat pan 108 can be fixed to the seat frame 104 with no need for a pivot or hinge, as the seat pan 108 may accommodate the power stroke via a small deformation of the seat pan 108 that raises the top surface 216.

It should be noted that the controller 124 may configured to time the action of the impulse generator 116 so that the axial compression load 120 can mitigate the tension loads 212 when they are at their greatest. For example, when the controller 124 receives a forward deceleration signal 128 from the inertial sensor 132, the controller 124 may be programmed to calculate an estimate of the most appropriate time to activate the impulse generator and/or the characteristic of the impulse(s). For instance, for an aircraft taxiing at 50 km/hr (31 mph) and decelerating to a full stop in 0.5 s (a 2.8 g event), the inertial sensor 132 may transmit to the controller 124 that a relatively slow speed, low g deceleration event is occurring. The impulse generator 116 may then deliver an axial compression load 120 one or more pulses (e.g., of low intensity and/or low frequency) over the estimated deceleration time. In another example, for an aircraft hitting the side of a mountain at 150 km/hr (93 mph) and stopping in 0.42 seconds (a 10 g event), the inertial sensor 132 may transmit to the controller 124 that is relative fast speed, high g deceleration event is occurring. The impulse generator 116 may then deliver an axial compression load 120 one or more pulses (e.g., of high intensity and/or high frequency) over the estimated deceleration time. In embodiments, the controller 124 signals the impulse generator 116 to deliver the axial compression load 120 at the appropriate time (e.g., taking into consideration the time that it takes for the impulse generator 116 to deliver the axial compression load 120.

It should be understood that the axial compression load 120 is intended to imply that the compression load is driven from the posterior of the spine upwards. In some cases, the force applied to the posterior of the spine may differ spatially or by angle based on the type or intensity of the deceleration. For example, for a relatively slow deceleration, where free flail is minimal, the axial compression load 120 may be applied perpendicular (e.g., upward) relative to the traveling direction of the aircraft. In another example, for a relatively intense deceleration, the axial compression load may be delivered at an angle away from perpendicular so that the axial compressive load 120 is applied to the posterior of the spine in an axial fashion as the passenger's back lunges forward (e.g., the angle of the axial compression load 120 follows, or tracks with, the spine during impact).

The impulse generator 116 include any technology that can provide a compression load 120, or a series of compression loads 120 or pulses upon to the spine of the passenger 204. In general, and as shown in FIGS. 3A-D, the impulse generator 116 includes an energy source 304 (e.g., a stored energy source) that can provide a compressive force 316, and at least one of a piston 308 or compression plate 312 that can translates vertically based on the compressive force. The energy source 304, piston 308 and/or compression plate may be disposed partially or fully within the seat pan 108.

Figure 3A:
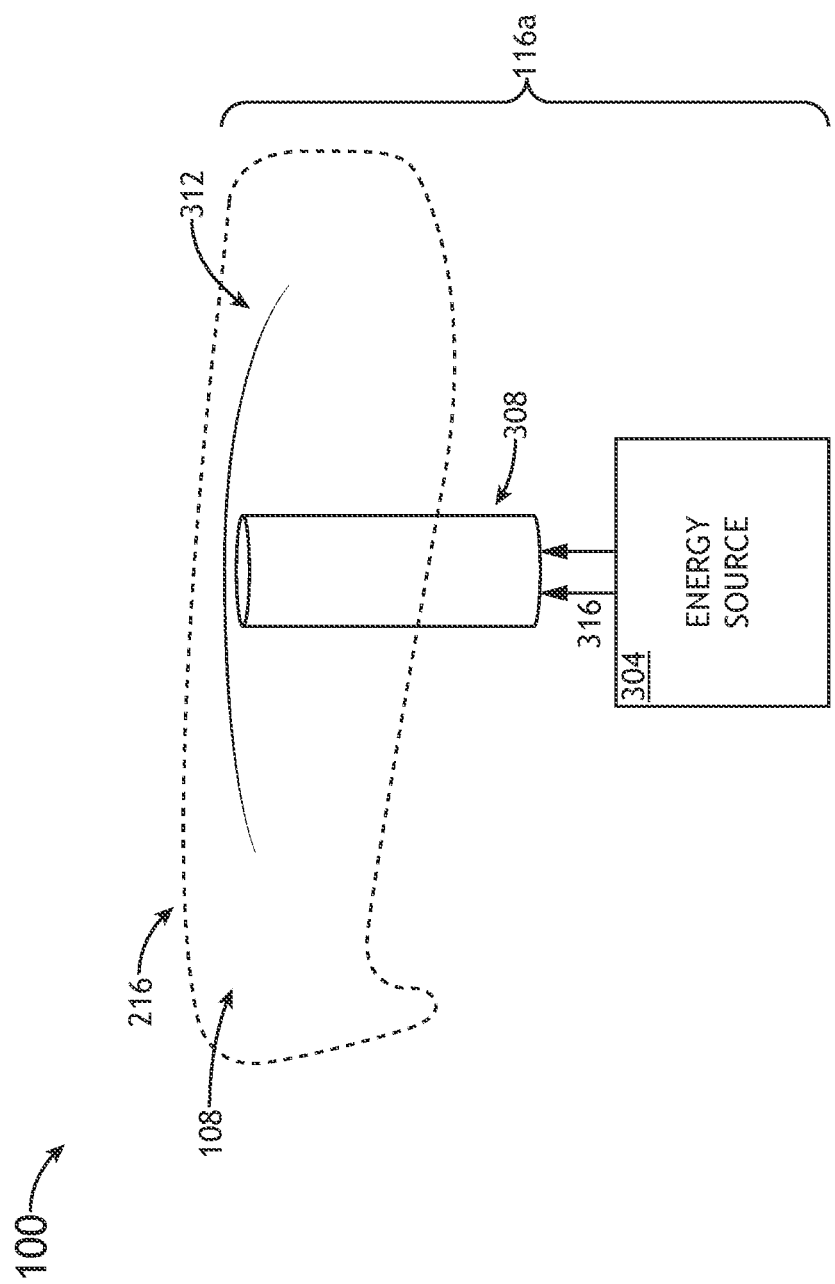
FIG. 3A is a diagram illustrating the safety seat system, wherein an energy source drives a piston towards a compression plate, in accordance with one or more embodiments of the disclosure.
Figure 3B:
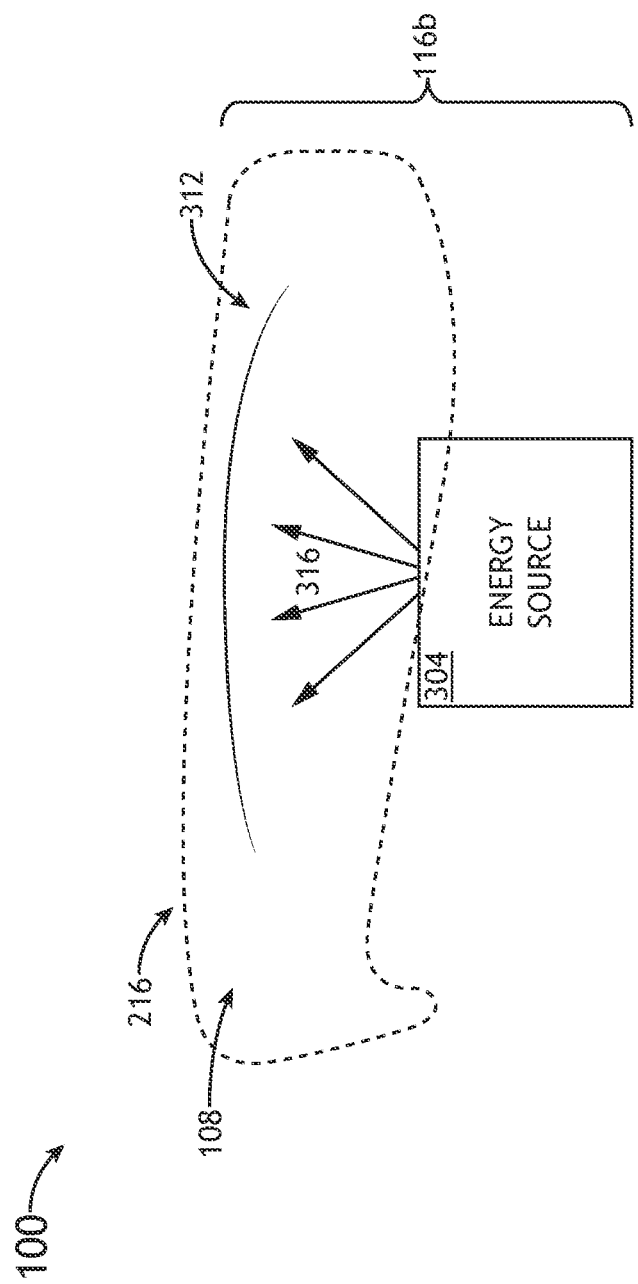
FIG. 3B is a diagram illustrating the safety seat system, wherein an energy source provides a compressive force towards a compression plate, in accordance with one or more embodiments of the disclosure.
Figure 3C:
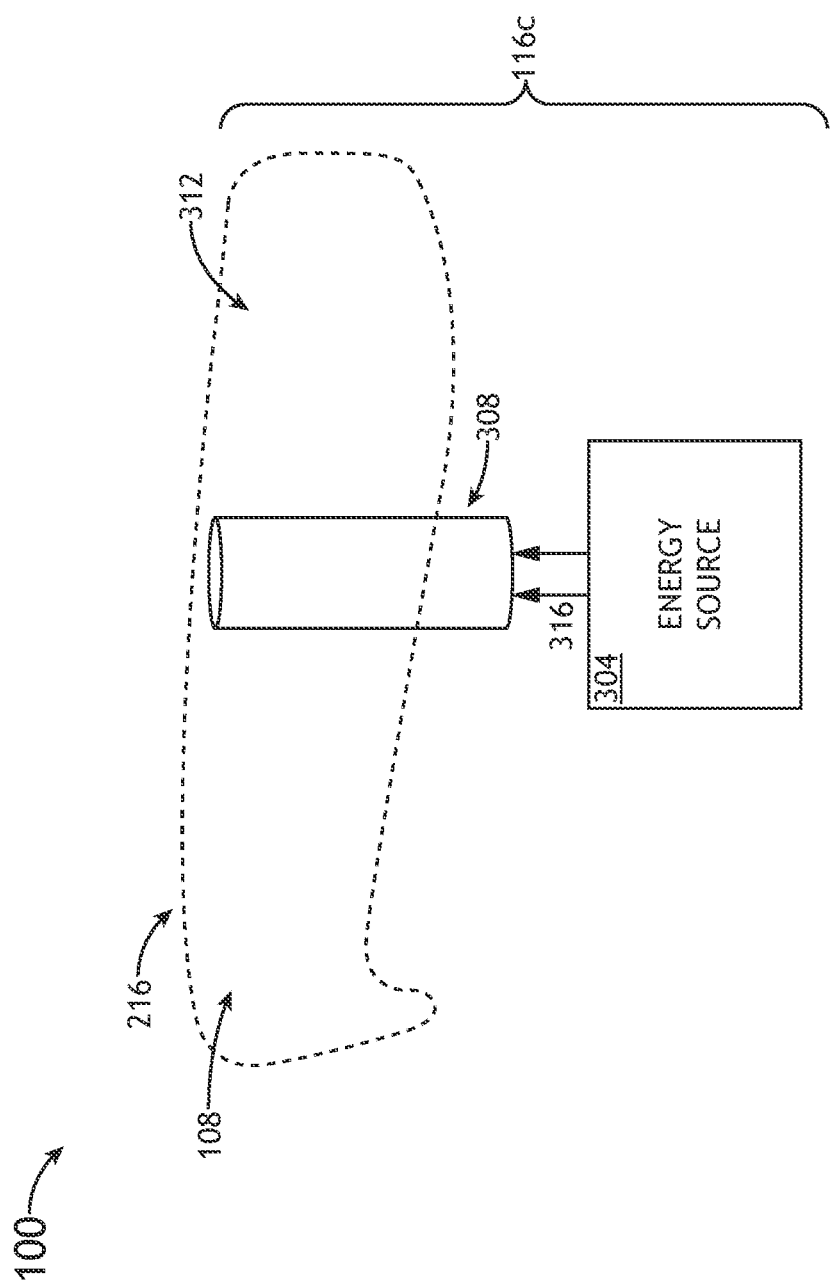
FIG. 3C is a diagram illustrating the safety seat system, wherein an energy source provides a compressive force towards a piston, in accordance with one or more embodiments of the disclosure.
Figure 3D:
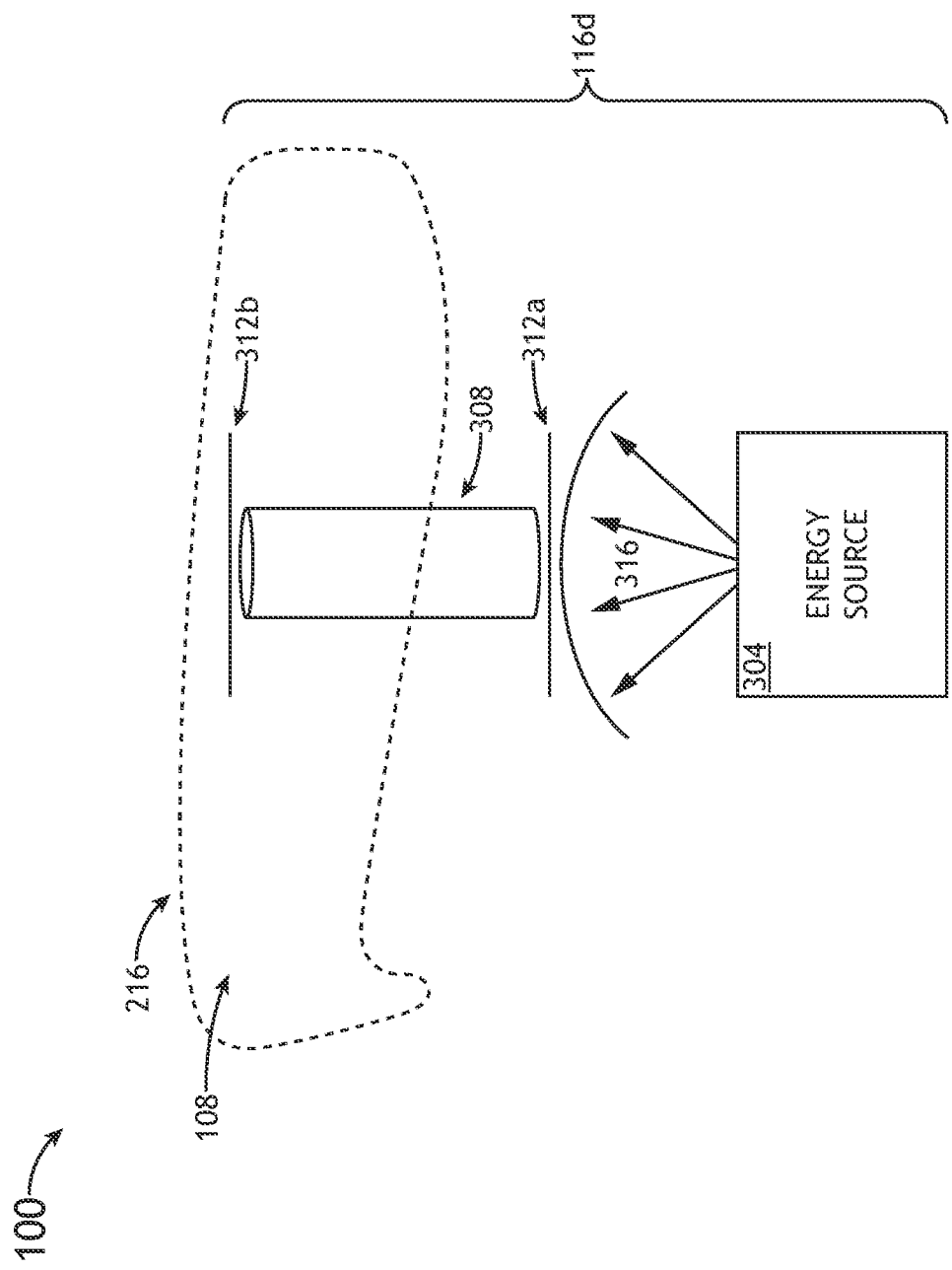
FIG. 3D is a diagram illustrating the safety seat system, wherein an energy source drives a first compression plate and piston towards a second compression plate, in accordance with one or more embodiments of the disclosure.

Many arrangements of the energy source 304, the piston 308, and the compression plate are possible. For example, the impulse generator 116a may be configured such that energy source 304 drives the piston 208 that is coupled to the compression plate 312, as shown in FIG. 3A. In another example, the impulse generator 116b may be configured such that energy source 304 drives only the compression plate 312, as shown in FIG. 3B. In another example, the impulse generator 116c may be configured such that energy source 304 only drives the piston 208, as shown in FIG. 3C. In another example, the impulse generator 116d may be configured such that energy source 304 initially drives a first compression plate 312a that is coupled to the piston 208, which ultimately drives a second compression plate 312b, as shown in FIG. 3D The energy source may include any type mechanical, electrical, or chemical power device. For example, the energy source 304 may comprise a chemical energy system that includes at least one explosive or expansion charge based on a chemical reaction. For instance, the chemical energy system may use a sodium azide-based reaction used in airbags to provide/impart the compression force 316 that translates the compression plate 312. In another instance, the chemical energy system may be configured as a ballistic charge containing a gun powder or other type of propellant. The chemical energy system may include several ballistic charges of one or more different intensities. For example, the chemical energy system may include an initial heavy charge to initiate spinal compression, followed by a quick succession of smaller charges to keep the spine in a compressive state.

In some embodiments, the energy source 304 may comprise one or more loaded springs. For instance, the impulse generator 116 may store a compression spring in a loaded state, kept in the compression state via a latch. Upon receiving an activation signal from the controller 124, the impulse generator 116 may release the latch, with the compressed spring providing the compressive force 316 to the piston 308 and/or compression plate 312.

In some embodiments, the energy source 304 may comprise a compressed gas. For example, the impulse generator 116 may store a compressed gas container containing a compressed gas, such as nitrogen or other inert gas, that is coupled to a chamber within the piston 308, with a valve that is disposed between the compressed gas container and the chamber that keeps gas from flowing into the chamber under normal conditions. Upon receiving the activation signal from the controller 124, the impulse generator 116 may release the valve, and the compressed gas rushing into the chamber, providing the compressive force 316 to the piston 308. In another example, the energy source 304 may comprise a gas spring coupled to, or integrated into, the piston 308. For instance, the gas spring may be stored in a loaded position that this subsequently released upon activation by the controller 124.

In some embodiments, the energy source 304 compress and electrical source (e.g., sourced from a local battery or vehicle power). For example, the impulse generator 116 may comprise a solenoid that the piston 308 can fit into. Upon receiving the activation signal from the controller 124, the impulse generator 116 (or the controller 124) may send an electrical pulse to the solenoid, causing a translation of the piston 308, providing the compressive force 316.

Figure 4A:
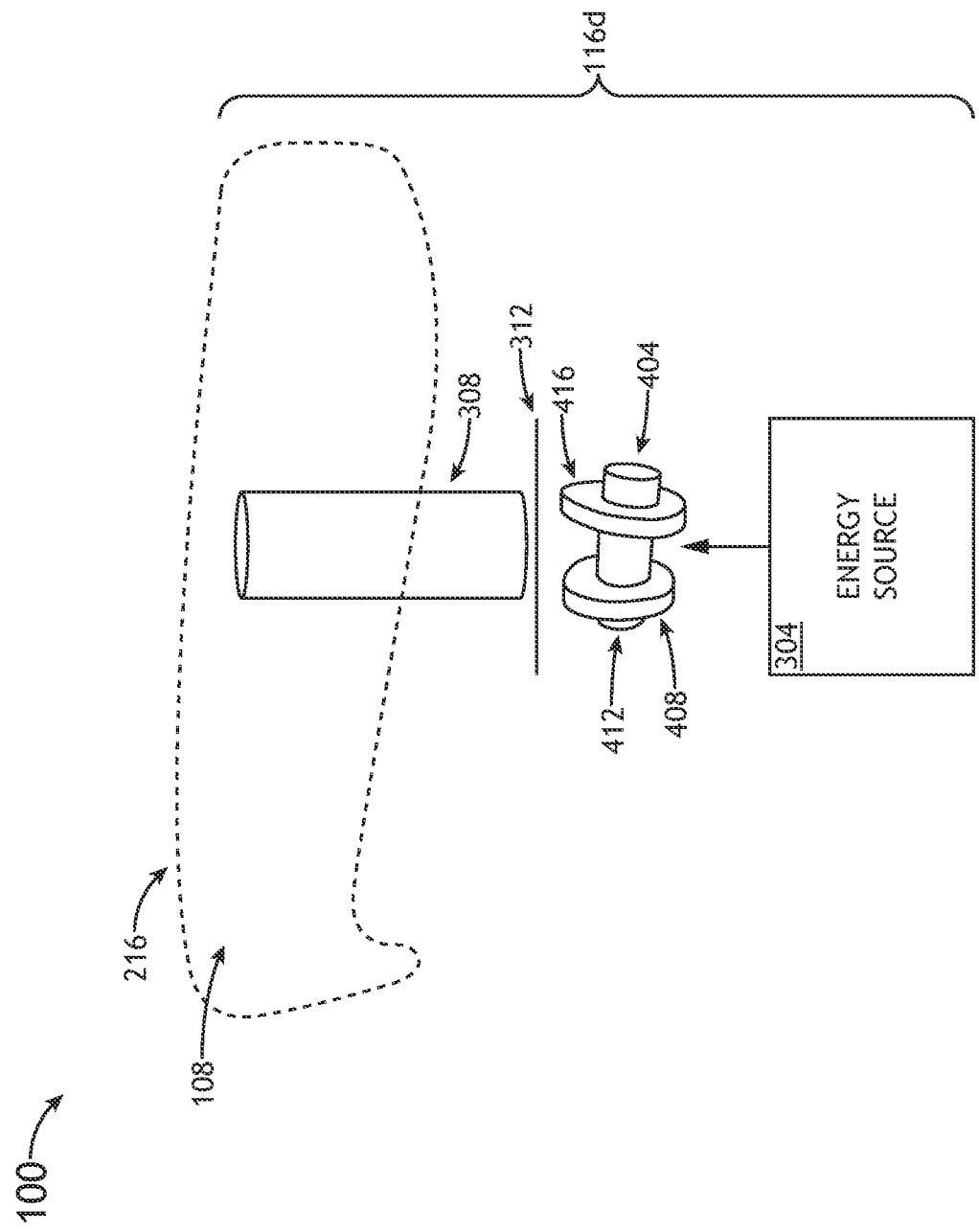
FIG. 4A is a diagram illustrating a safety seat system, wherein the impulse generator is configured as a rotating cam assembly; in accordance with one or more embodiments of the disclosure.

In some embodiments, the energy source 304 powers a mechanical device that provides the axial compression load 120. For example, the energy source 304 may power a rotating cam assembly 404 as shown in FIG. 4A, in accordance with one or more embodiments of the disclosure. For instance, the energy source may be configured as battery or vehicle electrical power source that powers an electric motor that rotates the cam 408 via a shaft 412. The nose 416 of the cam 408 may strike the piston 308 or compression plate, which delivers/imparts the axial compression load 120. In another instance, the cam 408 may be rotated by hydraulic means, via a hydraulic pump powered by the energy source 304. The controller 124 and/or impulse generator 116 may control the speed of the rotating cam 408, providing multiple impulses during a forward deceleration event. In some embodiments, a rotation profile may be generated by the controller 124 based on the type and severity of the forward deceleration event. For instance, controller may increase the speed of the shaft based upon the anticipated g-force sustained during the forward deceleration event. The rotation of the cam 408 may also be powered via a coiled spring or other stored energy device.

Figure 4B:
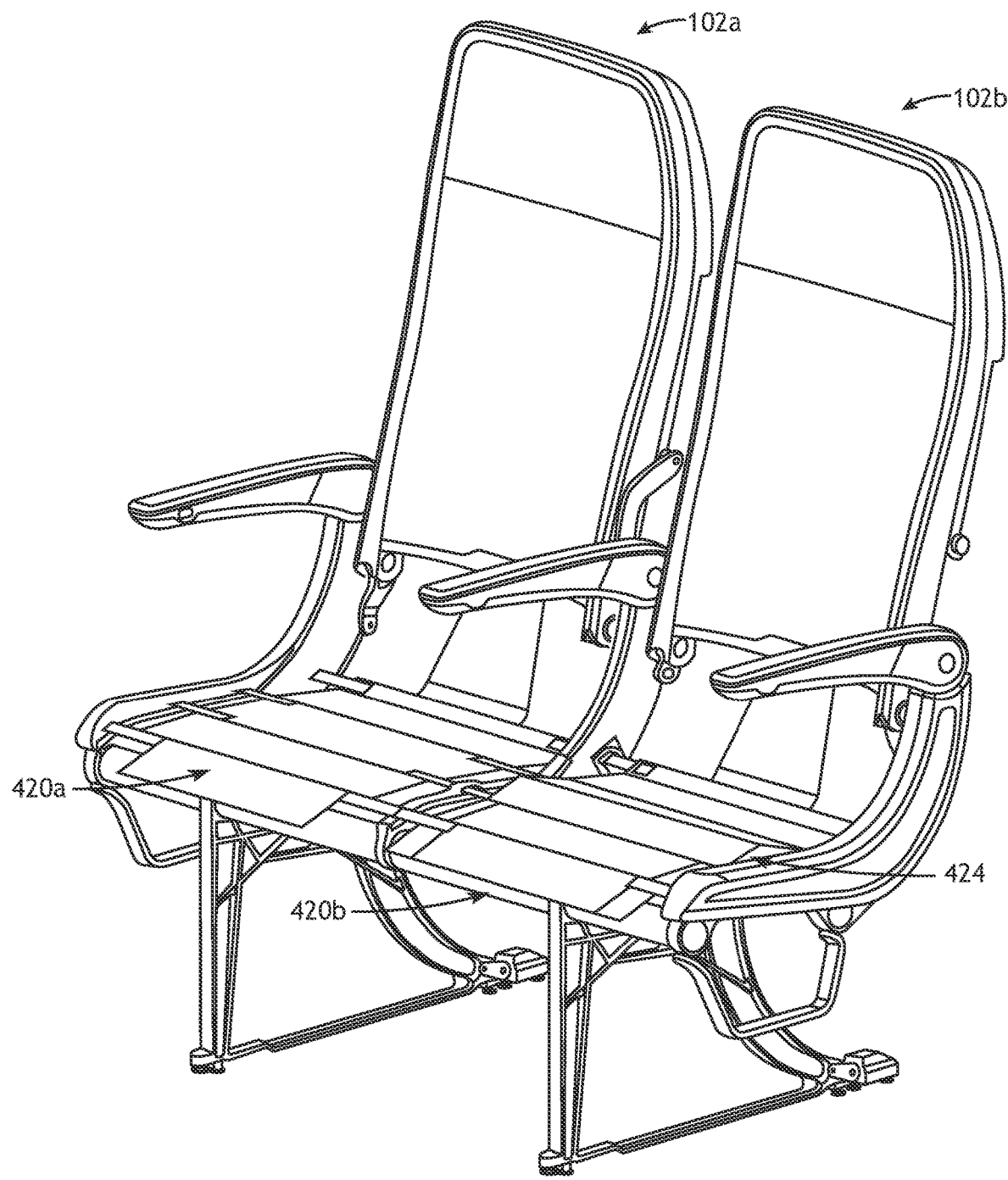
FIG. 4B is a diagram illustrating a perspective view of a passenger seat, in accordance with one or more embodiments of the disclosure.

FIGS. 4B-E are detailed illustrations of passenger seats 102a-b configured with, or included with, safety seat system 100, in accordance with one or more embodiments of the disclosure. The safety seat system 100 may include a segmented seat pan layer 420a-b (e.g., as shown in FIG. 4B), that changes confirmation upon activation of the impulse generator 116. For example, the segmented seat pan layer 420a-b may buckle during an impulse generator activation, causing a peak 424 to form in the segmented seat pan layer 420b. The formation of the peak 424 coincides with the application of an axial compression load 120 to the passenger 204.

Figure 4C:
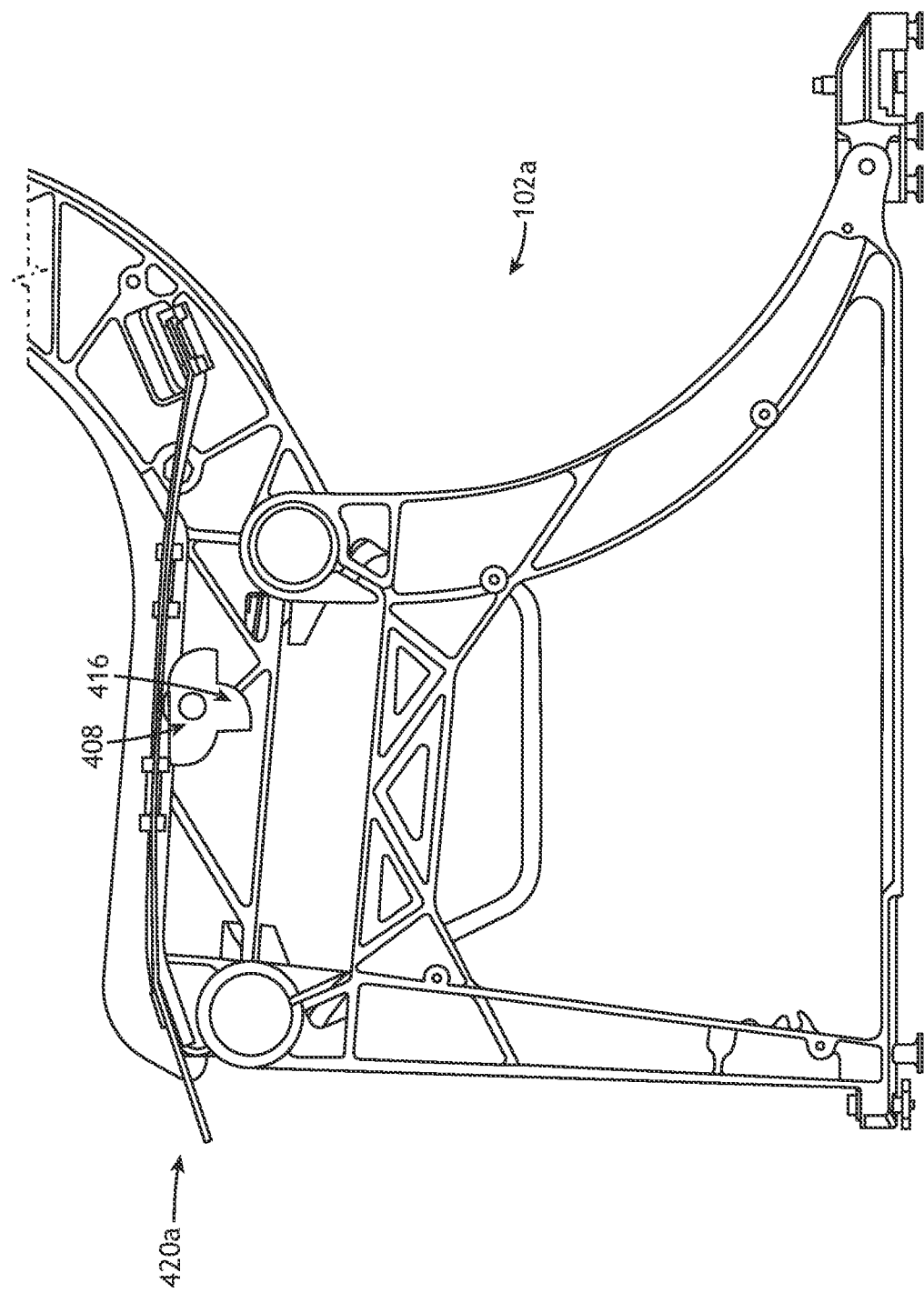
FIG. 4C is a diagram illustrating a side view of a passenger seat with a rotating cam configured in a non-active position, in accordance with one or more embodiments of the disclosure.
Figure 4D:
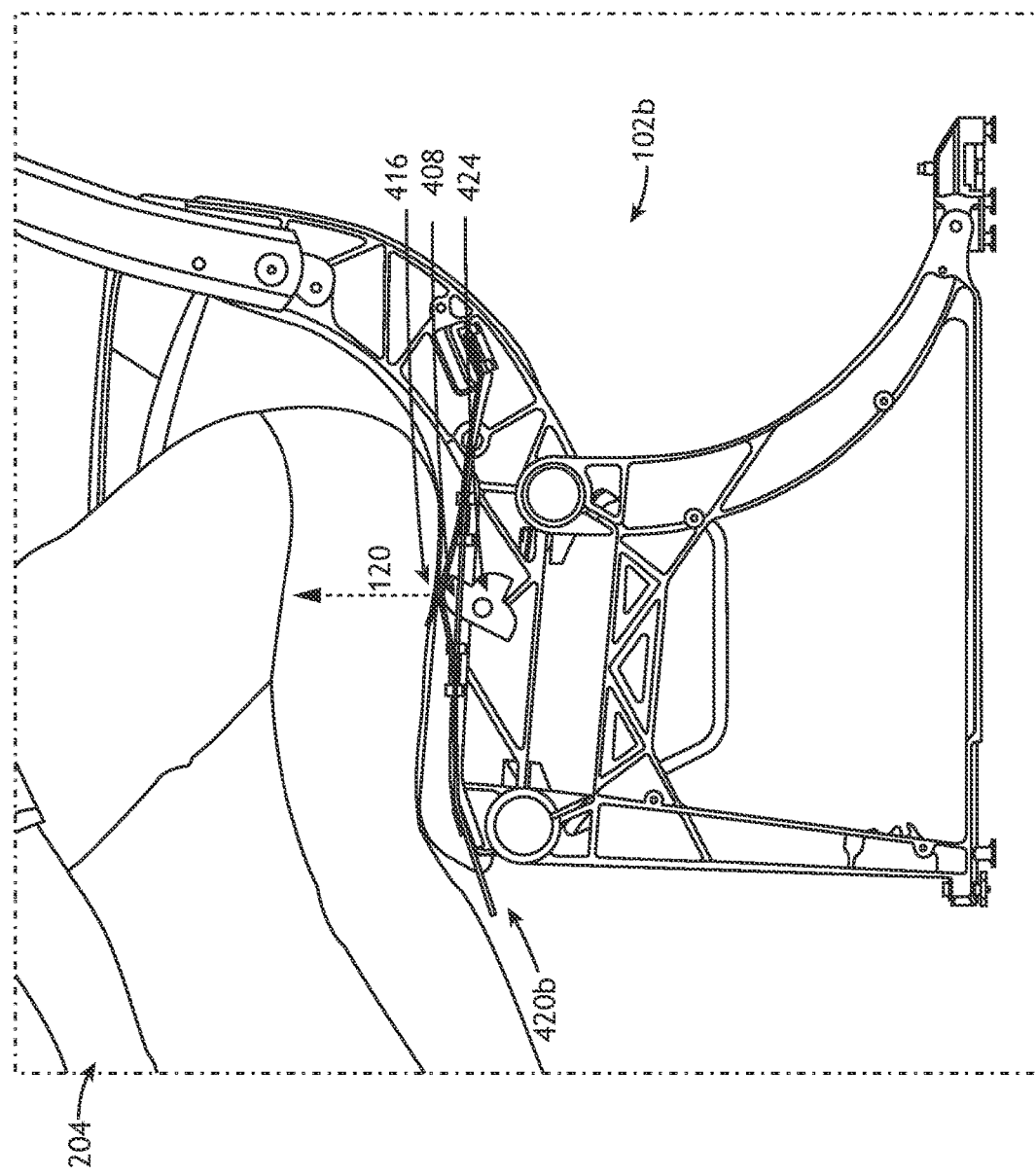
FIG. 4D is a diagram illustrating a side view of a passenger seat with a rotating cam configured in an active, peak forming, position, in accordance with one or more embodiments of the disclosure.
Figure 4E:
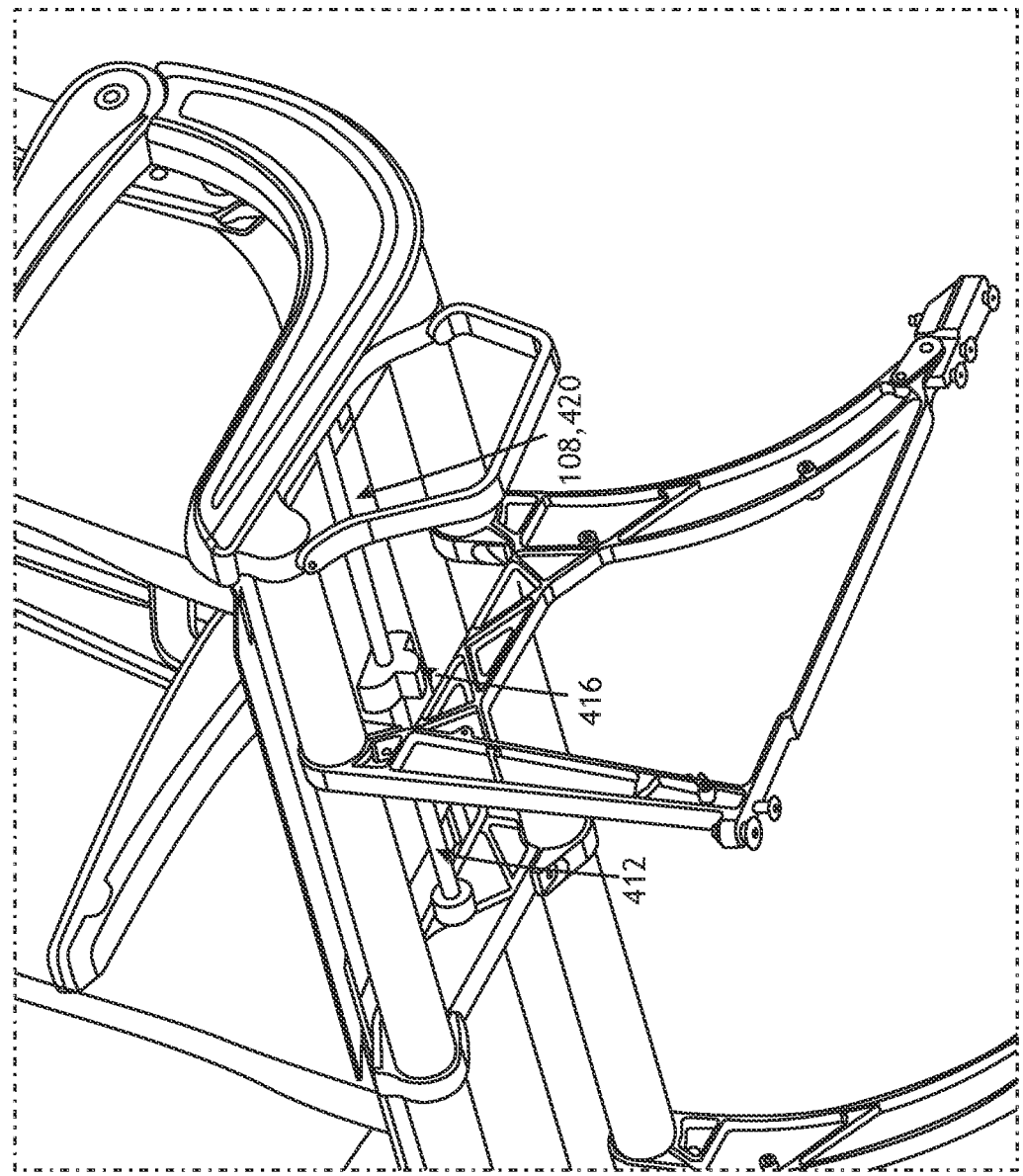
FIG. 4E is a diagram illustrating an underside of a passenger seat, in accordance with one or more embodiments of the disclosure.

FIG. 4C is a drawing illustrating a side view of the passenger seat 120a, in accordance with one or more embodiments of the disclosure. The nose 416 of the cam 408 is not protruding upward, therefore no peak 424 has formed on the segmented seat pan layer 420a. In FIG. 3D, the cam 408 has rotated, and the nose 416 of the cam 408 is now protruding upward, causing the segmented seat pan layer 420b to form a peak, which impart an axial compression load 120 to the passenger 204. FIG. 4E illustrates the underside of the passenger seat 120a showing the position of the cam 408, the shaft 412, and the seat pan 108/segmented pan layer 420b.

It is noted that although the examples of inertial events in this disclosure describe forward deceleration events, that the safety seat system 100 may be configured to mitigate spinal tension upon any acceleration or deceleration of a passenger 204. For example, the safety seat system 100 may be implemented in an automobile and deliver an axial compression load 120 upon a side impact by another automobile. Therefore, the above description should not be interpreted as a limitation on the embodiments of the present disclosure but merely as an illustration.

Figure 5:
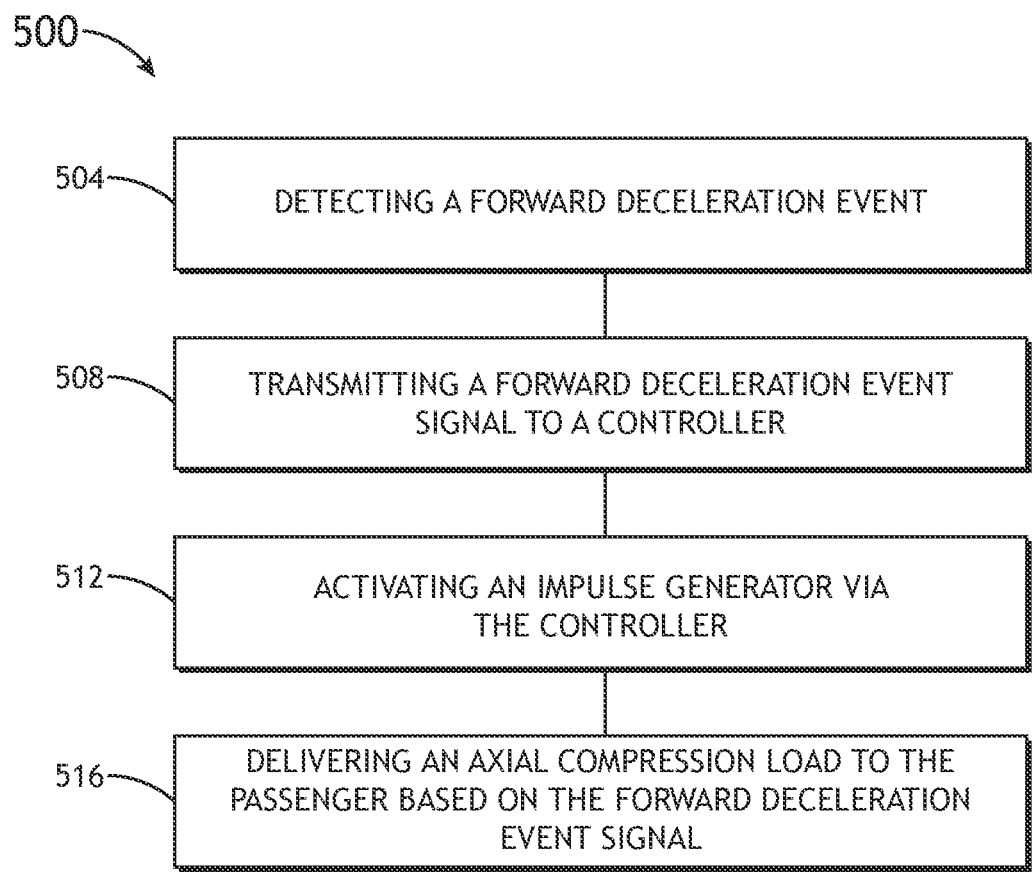
FIG. 5 is a block diagram illustrating a method for delivering an axial compression load to a passenger, in accordance with one or more embodiments of the disclosure

FIG. 5 is a block diagram illustrating a method 500 for delivering an axial compression load 120 to a passenger 204, in accordance with one or more embodiments of the disclosure. In some embodiments, the method 500 includes a step 504 of detecting a forward deceleration event. For example, the forward deceleration event (e.g., the initial microseconds/milliseconds of a vehicle crash) may be detected via an inertial sensor 132.

In some embodiments, the method 500 may further include a step 508 transmitting the forward deceleration signal 128 to the controller 124. For example, the inertial sensor 132 may send the forward deceleration signal 128 to the controller 124 in the form of a wireless message.

In some embodiments, the method 500 may further include a step 512 of activating an impulse generator 116 via the controller 124. For example, the controller 124 may send an electrical impulse to an impulse generator 116 that ignites, or leads to the ignition, of a sodium azide-based chemical reaction within the impulse generator. In another example, the controller may send an electrical signal controlling, or instructing the impulse generating to control, the cam assembly 404.

In some embodiments, the method 500 may further include a step 516 of delivering an axial compression load 120 to the passenger based on the forward deceleration signal 128. Once activated via the controller 124, the impulse generator 116 translates piston 308 and/or compression plate 312 vertically. A passenger 204 sitting on the seat pan 108 during this translation event will feel a small pulse, or a series of pulses, arising from the seat pan 108. The intent of the translation is not necessarily to physically move the passenger 204, but rather to engage the spine of the passenger 204, compressing or pre-compressing the spine to counter the great spinal tension forces that arise during a crash.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A safety seat system for a vehicle comprising:
an inertial sensor;
a seat pan fixed to a seat frame;
an impulse generator couplable to the seat pan and configured to provide an axial compression load onto a spine of a sitting passenger during a forward deceleration event, wherein the axial compression load is a deformation of the seat pan which raises a top surface of the seat pan less than one-half inch and with the seat pan configured to remain fixed relative to the seat frame; and
a controller communicatively coupled to the impulse generator and the inertial sensor, wherein the controller comprises: one or more processors; and a memory, wherein the one or more processors are configured to execute instructions stored upon the memory, wherein the instructions, upon the execution by the one or more processors, are configured to cause the one or more processors to:
receive a forward deceleration signal from the inertial sensor; and
activate the impulse generator based on the forward deceleration signal.

2. The safety seat system of claim 1, wherein the axial compression load is configured as a series of impulses.

3. The safety seat system of claim 1, wherein the impulse generator comprises a rotating cam assembly that includes a cam, wherein a nose of the cam imparts the axial compression load.

4. The safety seat system of claim 1, wherein the impulse generator comprises a chemical energy system that includes at least one explosive or expansion charge that imparts the axial compression load.

5. The safety seat system of claim 1, wherein the impulse generator comprises:
a stored energy source; and at least one of a piston or compression plate mechanically coupled to the stored energy source and to the seat pan, wherein upon a release of a stored energy from the stored energy source translates the piston or the compression plate, wherein a translation of the piston or compression plate provides the axial compression load.

6. The safety seat system of claim 5, wherein the stored energy source is configured as a compressed spring.

7. The safety seat system of claim 5, wherein the stored energy source is configured as an explosive.

8. The safety seat system of claim 5, wherein the stored energy source is configured as a compressed gas or a gas spring.

9. The safety seat system of claim 1, wherein the impulse generator comprises:
   a solenoid; and
   a piston mechanically disposed within the solenoid and mechanically coupled to the seat pan, wherein an activation of the solenoid translates the piston, wherein a translation of the piston provides the axial compression load.

10. The safety seat system of claim 1, further comprising the inertial sensor.

11. The safety seat system of claim 1, further comprising a seat belt.

12. A method for delivering an axial compression load to a passenger comprising:
   detecting a forward deceleration event;
   transmitting a forward deceleration event signal to a controller;
   activating an impulse generator via the controller; and
   delivering an axial compression load to the passenger based on the forward deceleration event signal,
   wherein the axial compression load is a deformation of a seat pan which raises a top surface of the seat pan less than one-half inch and with the seat pan remaining fixed relative to the seat frame.

13. The method of claim 12, wherein delivering an axial compression load comprises rotating a cam assembly.

14. The method of claim 13, wherein delivering an axial compression load comprises activating an expansion charge based on a chemical reaction.

* * * * *